(12) United States Patent
Littman (10) Patent No.: US 8,650,073 B2
(45) Date of Patent: Feb. 11, 2014

(54) GLASSES-FREE 3D ADVERTISING SYSTEM AND METHOD

(76) Inventor: Earl Littman, Houston, TX (US)

( * ) Notice: Subject to any disclaimer, the term of this patent is extended or adjusted under 35 U.S.C. 154(b) by 0 days.

(21) Appl. No.: 13/229,720

(22) Filed: Sep. 11, 2011

(65) Prior Publication Data

US 2011/0320278 A1 Dec. 29, 2011

Related U.S. Application Data

(63) Continuation-in-part of application No. 10/616,000, filed on Jul. 9, 2003, now abandoned.

(60) Provisional application No. 60/429,225, filed on Nov. 26, 2002.

(51) Int. Cl.
*G06Q 30/00* (2012.01)

(52) U.S. Cl.
USPC .......................................... 705/14.1

(58) Field of Classification Search
USPC .......................................... 705/14.1
See application file for complete search history.

(56) References Cited

U.S. PATENT DOCUMENTS

| 5,880,704 | A | * | 3/1999 | Takezaki | 345/6 |
| 5,923,252 | A | * | 7/1999 | Sizer et al. | 340/573.1 |
| 2002/0184098 | A1 | * | 12/2002 | Giraud et al. | 705/14 |
| 2003/0103644 | A1 | * | 6/2003 | Klayh | 382/100 |
| 2004/0047013 | A1 | * | 3/2004 | Cai et al. | 359/15 |

* cited by examiner

*Primary Examiner* — Daniel Lastra
(74) *Attorney, Agent, or Firm* — Kenneth A. Roddy (57) ABSTRACT

A glasses-free 3D advertising system and method wherein a number of wireless electronic digital 3D/2D video advertising players 10 are each located at a respective point-of-product display of consumer goods, detects the presence of an anonymous shopper proximate to the displayed consumer goods, and upon the shopper remaining at that location for a period of time, retrieves from memory and plays digital 3D or 2D video advertisements that contain information related specifically to the displayed consumer goods proximate to the advertising player, and records and reports statistical data relative to the advertisements played.

5 Claims, 5 Drawing Sheets

GLASSES-FREE 3D ADVERTISING SYSTEM AND METHOD

CROSS-REFERENCE TO RELATED APPLICATIONS

This application is a continuation-in-part of U.S. non-provisional application Ser. No. 10/616,000, filed on Jul. 9, 2003, now abandoned which claims the benefit of U.S. provisional application Ser. No. 60/429,225 filed on Nov. 26, 2002.

FIELD OF THE INVENTION

The present invention relates generally to systems and methods of in-store advertising and, more particularly, to a glasses-free 3D advertising system and method wherein a wireless electronic digital video player located at a point-of-product display of consumer goods, detects the presence of a shopper proximate to the displayed consumer goods, and upon the shopper remaining at that location for a period of time, retrieves from memory and plays digital 3D or 2D video advertisements that contain information related to the displayed consumer goods proximate to the advertising player, and records and reports statistical data relative to the advertisements played.

BACKGROUND ART

Advertising has become pervasive in today's society. Traditional advertising methods include television, radio, and publications, while more recent methods include internet-based advertisements. Regardless of the method employed, businesses utilize advertising to introduce consumers to their products and to encourage consumers to purchase their products.

Because a consumer might not purchase the product for days or even months after hearing or seeing an advertisement, most advertising methods, such as television, rely on innovative and creative advertisements that consumers will remember when making the purchase. Other methods for encouraging consumers to purchase a certain product include product demonstrations (e.g., prerecorded advertisements and in-person demonstrations) typically located in a area close to where the product is located. Short product demonstrations and advertisements are often prerecorded on a video tape or DVD and then played on a conventional video player in a location proximate to where the products are sold or purchased. While prerecorded video and in-person product demonstrations may escalate product sales, they have certain drawbacks, e.g. labor costs associated with in-person demonstrations. Although labor costs may be avoided by using a prerecorded video, the video may require manual and periodic intervention.

Conventional in-store electronic advertising devices often clutter the shopping area and compete for the shopper's attention. In many instances, the prerecorded video advertisements on a video tape or DVD are played continuously on a conventional video player at a location where shoppers to walk by, even if they are not interested in purchasing the consumer goods. This becomes intrusive, as well as boring to the shopper to see and hear the same old message repeated constantly. It is also very annoying to the store clerks who have to hear the intrusive ads all day long. In some instances, the store clerks may pull the plug on the in-store electronic media to keep from being further irritated. Most shoppers do not want to have their shopping experience interrupted by long sales spiels, but welcome learning about the reasons to choose and purchase a particular brand or product.

Some in-store electronic advertising devices are equipped with sensing systems that attempt to measures a detectable feature or characteristic associated with a detected shopper such as gender, race, ethnic background, age, nationality, height, and weight of the person or characteristic associated with a detected shopper and retrieves and displays stored promotional segments that are based on the detected features or characteristics of the shopper, rather than advertisements related to the products at the point at which the advertised product is displayed (Point-Of-Product).

There are several patents that are directed to various in-store electronic marketing and video advertising systems.

Vela et al, U.S. Pat. No. 4,882,724, discloses a communication system for a marketing area wherein message relay units are mounted on shopping carts and transported about the marketing area by a shopper. The message relay units provide audio and/or visual messages transmitted by a light signal generating system and a master computer at a control center. The light signals are transmitted over optical channels to predetermined subdivisions of the marketing area. The marketing area is divided into "zones" which are dedicated to receiving different types of messages. One group of zones are dedicated to receiving audio message productions, another group of zones are dedicated to receiving video message productions, another group of zones are dedicated to the reception of both audio and video messages, and still another group of zones are dedicated to the reception of traveling word messages. The messages that are transmitted vary depending upon which "zone" that the cart having the relay unit is within. The visually displayed messages include a list of items available for purchase, a graphics display of the floor plan of the marketing area and the merchandise display facilities therein, a video picture which may be a product or item available for purchase in the "zone" of the marketing area and a traveling word message.

Begum et al, U.S. Pat. No. 5,420,606, discloses an electronic paperless couponing system in which a store provides shoppers with an electronic communications device coordinated with an in-store electronic marketing system or coupon interface module via wireless data transmissions. The communications device has a display screen for display of a graphic of a redemption coupon that represents a discount for an item in the store available for purchase. The electronic communications device may be incorporated into a portable unit, mounted on a shopping cart or basket, or can be a stand alone unit designed exclusively to provide electronic coupons to prospective purchasers. The communications unit has a selection button for prospective shoppers to enter the selection of the coupon indicating the user's desire to redeem the coupon and a memory to record the selection until the shopper reaches the checkout counter and the discount is deducted from the purchases when the item subject to the discount has been purchased. Begum et al teaches that in its preferred embodiment the couponing system utilizes standard bar code data and product identification numbers to coordinate the coupon issuance with the product sales accounting using existing store or manufacturer accounting systems in conjunction with the system's computer that issues, records and redeems the discount coupons.

Klayh, U.S. Published Application 2003/0103644 discloses a method for presenting targeted advertising to a specific identified person or class of persons that utilizes a display apparatus, similar to a system for electronic games in which scores achieved on the games are transmitted to one or a hierarchy of computers in which a winner is determined. At least one computer stores a player code associated with player credits. The players insert credit cards into the games which read the player codes, send the codes to a computer, obtain verification signals from the computer and are thereby enabled. The computer also stores handicap values associated with players and/or the games, and modifies the scores by the handicap values. The computer can also download advertising, winner or other messages to specific ones or all the games for display, and can cause the games played to be modified or changed. The system employs regional servers, each located at a separate regional data center, and each having a memory containing a corresponding database that stores not only score data, but also values of money on deposit to be credited against the playing of a game, handicaps of players and/or games, and also parameters and content relating to advertising, premiums, etc., and can also store specialized data relating to parameters used in a game which loaded by a decision support server from data stored in a database with which it communicates. Validation and redemption terminals in communication with each regional server include a card reader and preferably a bar code reader, and a smart card reader/writer, or the equivalent, coupled to a printer. The card read by the redemption terminal is a specific person or class of person identifier, the identification being stored by the magnetic strip or chip on the card. Alternatively, persons can be identified by other means, such as by voice recognizer, palm or finger print detector, iris reader, etc. The printer is used to print receipts and coupons, preferably with a bar code. In operation, games, advertising and parameters relating to loyalty points and/or coupons are downloaded under control of the decision support server and distributed to the regional servers, or alternately, the games, parameters and/or advertising are stored at the arcade on local mass storage devices. The advertisements are preferably written within a shell, with software "hooks" between the advertisements and shell. The body of an unidentified player standing adjacent to a regional server may be detected, but if no service has been selected by the unidentified player, a different type and sequence of advertisements is run, which is different from the type and sequence shown to a person or class of persons whose identity has been detected and verified, the later advertisements being based on one of the target indicators matched to the identified person or class of person.

SUMMARY OF THE INVENTION

The present invention overcomes the aforementioned problems and is distinguished over the prior art in general, and these patents in particular by a glasses-free 3D advertising system and method wherein wireless electronic digital video advertising players, each located at a point-of-product display of consumer goods, detects the presence of an anonymous shopper proximate to the displayed consumer goods, and upon the shopper remaining at that location for a period of time, retrieves from memory and plays digital 3D or 2D video advertisements that contain information related to the displayed consumer goods proximate to the advertising player. The advertising players may be equipped with an automatic sound level controller that monitors ambient noise and adjusts the sound level to keep the audio level at a controlled conversational tone. In some embodiments, the advertising players may also be equipped with an aroma release device that releases a chemical to appeal to the consumer's sense of smell, or may be equipped with a RFID reader (radio frequency identification device) capable of reading RFID tags which may be placed within the packaging or on the consumer goods proximate to the advertising player to detect which consumer goods the shopper has removed from the display shelf.

The advertising players are connected in wireless communication with one or more store controllers that may located in an inconspicuous location remote from the advertising players. For example, but limited thereto, in a retail store of any variety. Similarly, the store controllers are connected in communication with one or more remote primary servers by way of a wireless, cellular, satellite, or Internet communication system or a combination thereof. The primary server may be a single computer system, or an array of computer systems coupled together to form a network. Each store controller may likewise be a computer system, but may not require the degree of computing capability that may be present in the primary server.

Each primary server contains a database of advertisers, a database of locations of each advertising player, a repository database of digital video and audio advertising media and data, and a database of advertising records. The advertising players store digital video and audio advertising media and data received from a store controller or server to be played when invoked and store the number of times an advertisement was played in a given period of time, and transmits statistical data relative to advertisements played to the store controller or server.

The primary server(s) or store controllers download digital video and audio advertising media and data to each advertising player, queries each said advertising player to determine the statistical data relative to advertisements played thereby, control the sequence of playing advertisements stored in by each advertising player, transmits new digital video and audio advertising media and data to each advertising player, and tracks the operating status of each advertising player.

One of the significant features and advantages of the present system and method is that the advertising players present a full-color glasses-free 3D video/audio advertisement to the viewer where the images appear to pop-out of the display screen, thus the advertisers can make their products come to life directly face-to-face with their potential customer.

Another significant feature and advantage of the present system and method is that the advertising player will not be activated when a shopper walks by the player and the product display, and will automatically play only upon a shopper remaining for a period of time at the location where the product or consumer goods are displayed, thus only showing the advertisement to an interested shopper and at the advertiser's "Point-Of-Product" display, and thereby reducing the amount of waste of the advertising investment which typically runs at about 50% of every dollar spent.

Another significant feature and advantage of the present system and method is that the advertising players will reduce the amount of inherent clutter in the retail establishment due to other advertising media where multiple ads fight for the viewer's attention.

Another significant feature and advantage of the present system and method is that the advertising players are configured to be located at the point at which an advertised product is displayed (Point-Of-Product) and within easy reach of the shopper such as on the lip of a shelf, a rack, a floor standing display, a beverage dispenser or cooler, a freezer case or a freezer door, and are sized such they do not block or hide the merchandise, and allow products to be readily stacked or removed.

Another significant feature and advantage of the present system and method is that the advertising players can be programmed and assigned exclusively to one advertiser per player, thereby eliminating competitive ads or products that confuse the buying public and affording the advertiser with one uniform message in real time, per player, to influence and to persuade a shopper to purchase the advertised product which is within each reach at the at the advertiser's "Point-Of-Product" display.

Another significant feature and advantage of the present system and method is that the advertising players can be provided with an automatic sound level controller that monitors the ambient noise around the player and adjusts the sound level to keep the level at a controlled conversational tone just as the advertiser would want their sales rep to address their in-store customers.

Another significant feature and advantage of the present system and method is that the advertising players can display a text message which can flash, scroll or pause to deliver the price of a product, or any other promotion which the advertisers chooses to inform their potential customers of.

Another significant feature and advantage of the present system and method is that the advertising players can display a text message which may invite the shopper to call a telephone number using their cell phone and have a two-way real-time conversation with an advertiser representative while the shopper is standing at the at the advertiser's "Point-Of-Product" display, thereby allowing a shopper to ask a question, such as about nutrition and receive an answer, and allows the advertiser representative to thank the caller by sending a redeemable coupon for the advertised product to the caller's cell phone. This feature also allows an advertiser to capture the phone number of the caller and possibly their email address for future direct marketing efforts, and the caller, thankful for the helpful information, will most probably become a loyal customer of the advertiser.

A still further feature and advantage of the present system and method is that the advertising players are coupled with a remote server via a communication system which allows statistical data regarding specific advertisements to be transmitted to the remote server and allows the remote server to download digital video and audio advertising media and data to an advertising player, query the advertising player to determine statistical data relative to advertisements played thereby, and alter the sequence of playing advertisements stored in the memory of the advertising player, delete selected advertisements from the player memory, and transmit new digital video and audio advertising media and data to be stored in the player memory, and to track the operating status of the advertising player.

Other features and advantages of the invention will become apparent from time to time throughout the specification and claims as hereinafter related.

NOTATION AND NOMENCLATURE

Certain terms are used throughout the following description and claims to refer to particular system components and functions. This document does not intend to distinguish between components that differ in name but not function.

In the following discussion and in the claims, the terms "including" and "comprising" are used in an open-ended fashion, and thus should be interpreted to mean "including, but not limited to". Also, the terms "couple", "coupled", "connected" or "connected with" is intended to mean either an indirect or direct connection. Thus, if a first device is connected with a second device, that connection may be through a direct electrical connection, or through an indirect electrical connection via other devices and connections, whether connected wirelessly or by wiring, or a combination thereof.

The following terms, as used throughout the following description and claims to describe particular system components are given the ordinary and customary meanings attributed to them by those of ordinary skill in the art. The term "server" as used herein means a computer or storage device on a network that that stores and makes access to data files, programs, and peripheral devices, available to workstations on the network. The term "client" means a computer or workstation on a network that gains access to central data files, programs, and peripheral devices through a server. The term "controller" also known as "control unit" or "processor" means the key component or part of a computer that contains circuitry necessary to interpret and execute instructions fed into the device to allow the computer to use certain kinds of peripheral devices and controls the transfer of data from a computer to a peripheral device and vice versa. The term "work station" means a computer terminal or microcomputer connected to a mainframe, minicomputer, or data-processing network, typically used for computer-aided design, electronic publishing, or other graphics-intensive processing. The term "proximate" means very near.

The terms "point-of-purchase" (POP), "point-of-sale" (POS), and "checkout" refers to the physical location at which a sales transaction occurs wherein consumer products and goods are sold to customers including ringing up orders as well as generating the receipt and finalizing the purchase. The terms "checkout terminal", "point-of-purchase terminal", and "point-of-sale terminal" refers to a terminal such as a standard or electronic cash register, and more generally to the hardware and software used for checkouts.

The terms "Point-of-Product" and "Point-of-Product Selection", as used herein, refers to the physical location at which consumer products and goods for sale are displayed and where the selection of the brand of the consumer products and goods and the shopper's decision to purchase is typically made, such as a store shelf, rack, floor standing display, cooler, or freezer case. It should be noted that this physical location differs from the "point-of-purchase" and "point-of-sale" location as defined above.

The term "shopper", as used herein refers to a person who visits a store or retail establishment in search of products or consumer goods to purchase. The term "consumer", as used herein refers to a person who purchases or acquires products or consumer goods. The terms "unidentified shopper" and "unidentified consumer" refer to a shopper or consumer who is not an identified person or a member of a known class of persons. As used in conjunction with the present invention, the "unidentified shopper" or "unidentified consumer" is a person whose identity, features, and/or distinguishing characteristics associated with the person are not detected or recorded by the system.

DESCRIPTION OF THE PREFERRED EMBODIMENTS

As discussed briefly above, the present invention is directed toward a glasses-free 3D advertising system and method wherein a number of wireless electronic digital 3D/2D video advertising players 10 are each located at a respective point-of-product display of consumer goods, detects the presence of an anonymous shopper proximate to the displayed consumer goods, and upon the shopper remaining at that location for a period of time, retrieves from memory and plays digital 3D or 2D video advertisements that contain information related specifically to the displayed consumer goods proximate to the advertising player, and records and reports statistical data relative to the advertisements played.

For a better understanding of the entire system 100 and its operation, a description of one of the wireless glasses-free 3D advertising players 10 of the present system and its features will be first described, followed by a description of the other related system components, and operation of the system.

Figure 1:
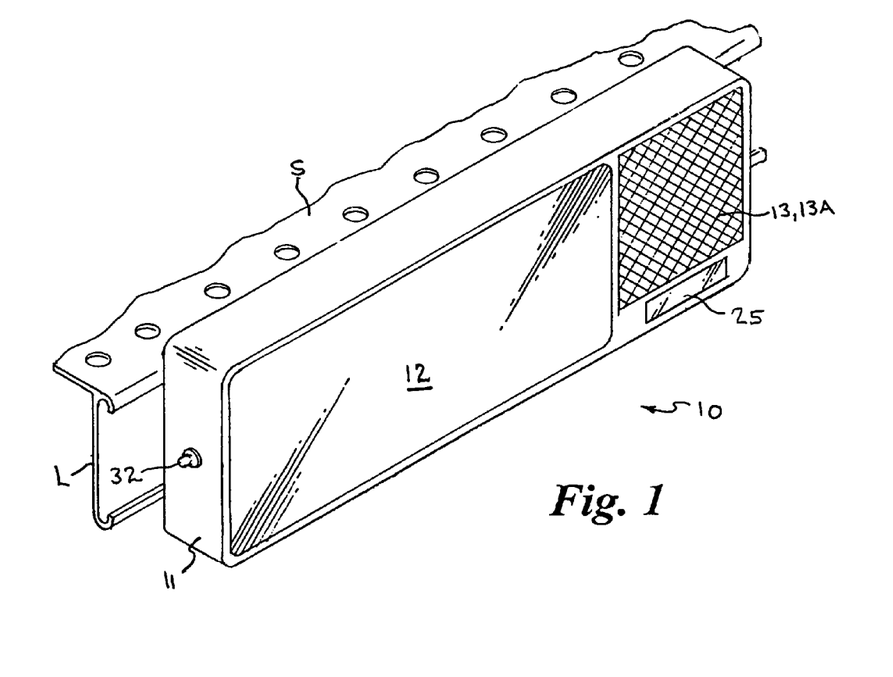
FIG. 1 is a perspective view of a wireless glasses-free 3D advertising player in accordance with the present invention.
Figure 2:
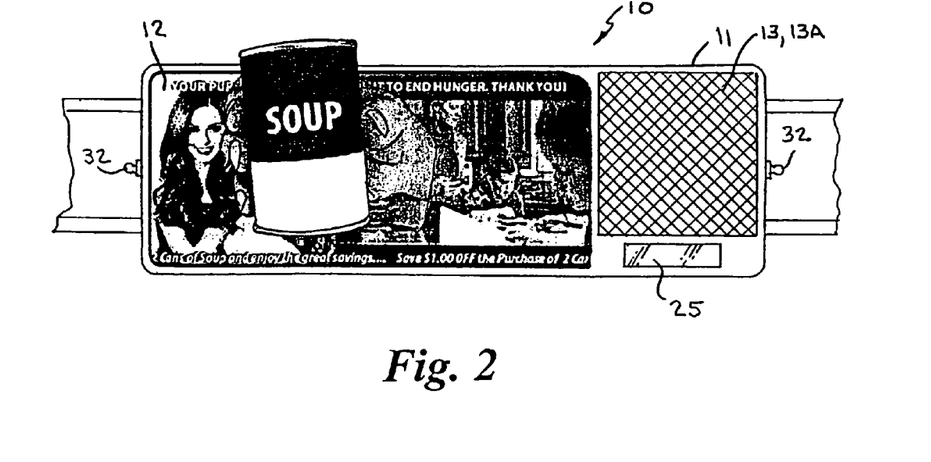
FIG. 2 is an illustration of a simulated glasses-free 3D advertisement displayed by the advertising player.
Figures 3, 4, 5:
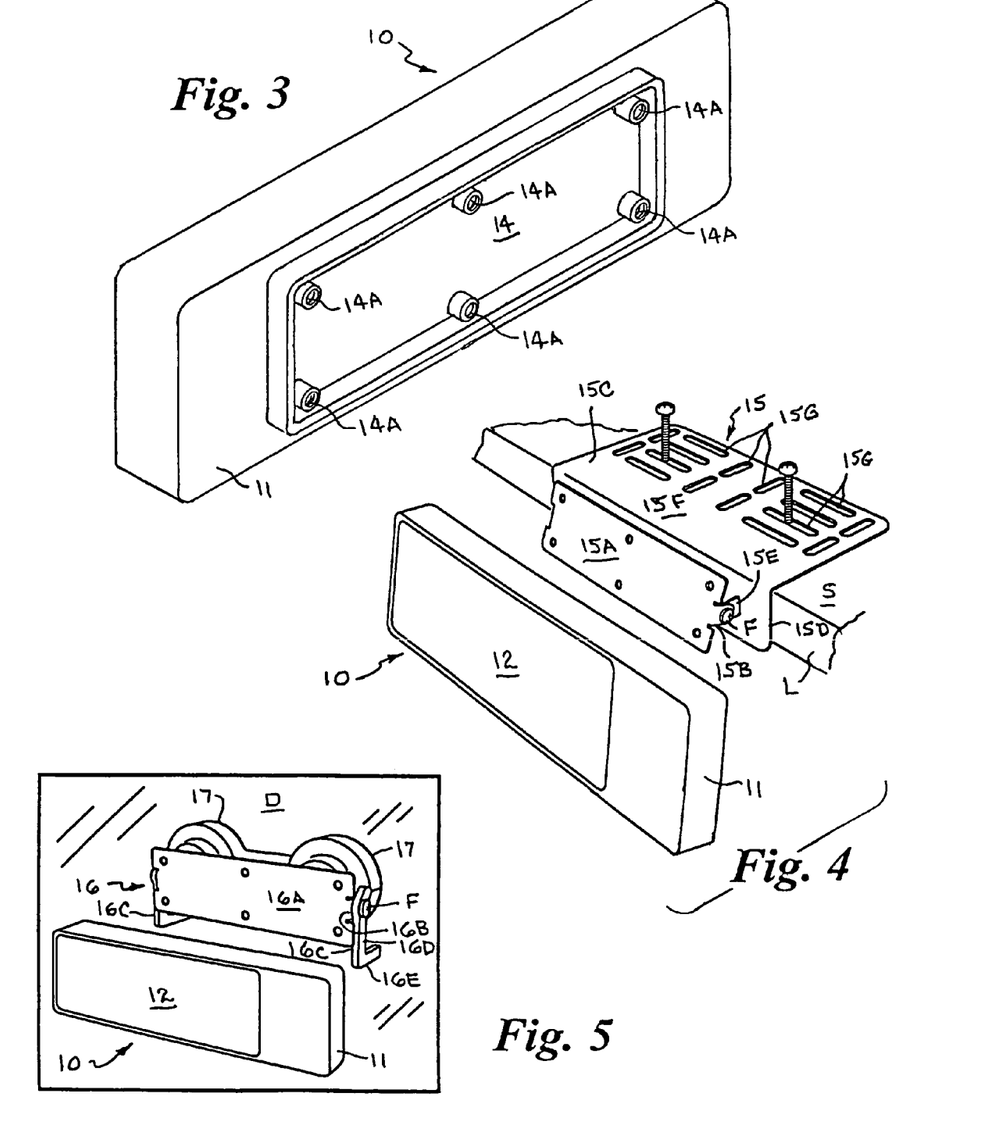
FIG. 3 is a perspective view of the back side of the wireless glasses-free 3D advertising player.
FIG. 4 is an exploded perspective view of an example of a mounting arrangement for releasably mounting an advertising player to a shelf.
FIG. 5 is an exploded perspective view of an example of a mounting arrangement for releasably mounting an advertising player to a glass door of a freezer.

Referring to FIGS. 1, 2 and 3, each wireless 3D and 2D advertising player 10 houses a digital processor and electronic circuitry (described below) within a small generally rectangular housing 11 and includes an autostereoscopic 3D LCD flat panel display screen 12. A suitable autostereoscopic 3D LCD flat panel display screen for use is, for example but not limited thereto, a 3D LCD flat panel display manufactured by Newsight Japan, Ltd., of Tokyo, Japan (www.newsightjapan.jp). The autostereoscopic display screen 12 utilizes a lenticular lens or parallax barrier system and associated conversion software, where different images are shown to the left and right eyes using a special filter in front of the display. This system achieves a wide viewing angle and smooth stereoscopic reproduction without the use of 3D glasses, and can also display conventional 2D video reproduction as well. FIG. 2 illustrates a simulated glasses-free 3D advertisement displayed by the advertising player 10.

The autostereoscopic 3D LCD flat panel display screen 12 is disposed on one side of the housing 11 and an audio speaker 13 covered by a grill 13A is disposed adjacent to the display screen. The back side of the housing 11 is provided with a bracket mounting area 14 which receives several types of interchangeable mounting brackets for selectively and releasably mounting the advertising player 10 at a point-of-product display of consumer goods within easy reach of the shopper, such as on or in front of the lip of a shelf, a rack, a floor standing display, a beverage dispenser or cooler, a freezer case, or a freezer door. The advertising player 10 is sized so as not to block or hide adjacent merchandise, and allow products to be readily stacked or removed. In the illustrated example, the bracket mounting area 14 on the back side of the housing 11 is provided with a plurality of internal threaded raised bosses 14A for receiving threaded fasteners.

FIG. 4 shows an example of a mounting bracket 15 which may be used to releasably mount the advertising player 10 to a shelf S such that the player is disposed in front of the price channel or lip L of the shelf and extends longitudinally along the shelf edge. The mounting bracket 15 has a first generally rectangular flat mounting plate 15A which is received on, and attached to, the bracket mounting area 14 on the back side of the housing 11 using conventional fasteners, and has perpendicular ears 15B at laterally opposed ends. A second generally L-shaped mounting plate 15C having a short vertical plate portion 15D with perpendicular ears 15E at laterally opposed ends is pivotally and adjustably connected to the ears of the first mounting plate 15A with conventional fasteners F. A generally rectangular flat shelf mounting plate portion 15F having a plurality of slots 15G extends horizontally from the short vertical plate portion 15D is received and adjustably attached to the display shelf S with conventional fasteners F. Unlike some advertising devices, the length of the housing 11 does not extend perpendicularly outward from the shelf into the aisle, but instead extends longitudinally along the shelf edge.

FIG. 5 shows an example of another mounting bracket 16 which may be used to releasably mount the advertising player 10 to a glass door D of a freezer such that the player is disposed in front of the door and parallel thereto. The mounting bracket 16 has a generally rectangular flat mounting plate 16A which is received on, and attached to, the bracket mounting area 14 on the back side of the housing 11 using conventional fasteners, and has perpendicular ears 16B at laterally opposed ends. A pair of laterally opposed generally L-shaped legs 16C, each having a vertical portion 16D pivotally and adjustably connected to the ears of the mounting plate 16A, respectively, with conventional fasteners F, and a lower horizontal leg portion 16E extending rearward therefrom to engage the surface of the glass door D. At least two suction cups 17 mounted on the mounting plate 16A extend rearward therefrom to be releasably affixed to the surface of the glass door D.

Figure 6:
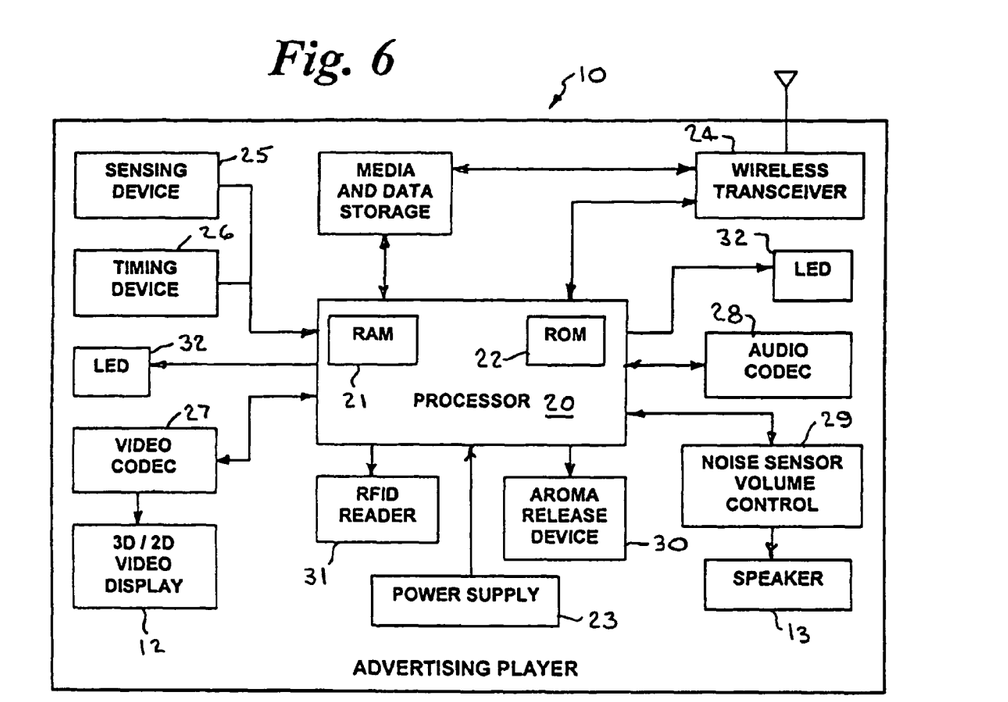
FIG. 6 is a schematic block diagram illustrating the components of an advertising player in accordance with the present invention.

Referring additionally to FIG. 6 an advertising player 10 in accordance with the present invention is shown in a schematic block diagram. The components of the advertising player and other components the present system are shown in schematic block diagram format for clarity of presentation. One skilled in the art of contemporary computer design and construction well understands standard assembly of connectors, electronic chips and other electronic parts which are used in such sub-assemblies.

As seen in FIG. 6, the advertising player 10 contains a processor 20 which may be any suitable commercially available microcontroller or microprocessor. While a processor, microcontroller or microprocessor generally may have on-board random access memory (RAM) and read-only memory (ROM), the processor 20 may be provided with additional RAM 21 and ROM 22 to perform file storage and operating programs to carry out computing functionality. The advertising player is powered by replaceable rechargeable batteries 23.

A commercially available wireless transceiver 24 communication device is operably connected with the processor 18 for receiving and transmitting digital video and audio advertising media and data from and to a store controller 40 and/or a primary server 50 by way of a communication system 60 (described hereinafter).

A commercially available sensing device 25 is operably connected with the processor 18 for sensing the presence of a person or shopper proximate to the advertising player 10, and a commercially available timing device 26 is operably connected with the processor 20 and the sensor device 25 for determining the period of time that the sensed person or shopper is proximate to the advertising player 10. The sensing device 25 may be an infrared detector, a motion detector, or an optically-based detector capable of detecting the presence of a human body, which when activated triggers the timing device 26. The timing device 26 is calibrated to trigger the playing of an advertisement only after a predetermined period of time has elapsed from the initial detection. The elapsed time is greater than the average time it takes a person to walk past the advertising player or cross the infrared beam. This feature prevents the advertisements from being intrusive because an advertisement would not be played every time a person walked by. This feature also allows the advertisement to be played only to those shoppers who may be spending more time at the "Point-Of-Product" display where the product or consumer goods to be advertised are displayed.

A commercially available video encoder (codec) 27 is operably connected with the processor 20 and the autostereoscopic 3D LCD flat panel display 12, and a commercially available audio codec 28 and speaker 13 are operatively connected with the processor 20 for reproducing and playing digital 3D or 2D video and audio advertisements from the stored digital video and audio media and data.

A commercially available sound level control device 29 is operably connected with the processor 20 and the speaker 13, such as the type having an ambient noise sensor microphone for detecting ambient noise, and automatically adjusts output volume in response to changing ambient noise levels maintain the volume at a conversational level.

In some embodiments, the advertising players 10 may also be equipped with an aroma release device 30 connected with the processor 20 that releases a chemical to appeal to the consumer's sense of smell, or may be equipped with a RFID reader (radio frequency identification device) 31 connected with the processor 20 capable of reading RFID tags which may be placed within the packaging or on the consumer goods proximate to the advertising player to detect which consumer goods the shopper has removed from the display shelf. In some embodiments, the advertising players 10 may also be equipped with light emitting diodes (LED's) 32 mounted at each end of the housing 11 and connected with the processor 20 to flash on and off to draw attention to the advertising player.

Figure 7:
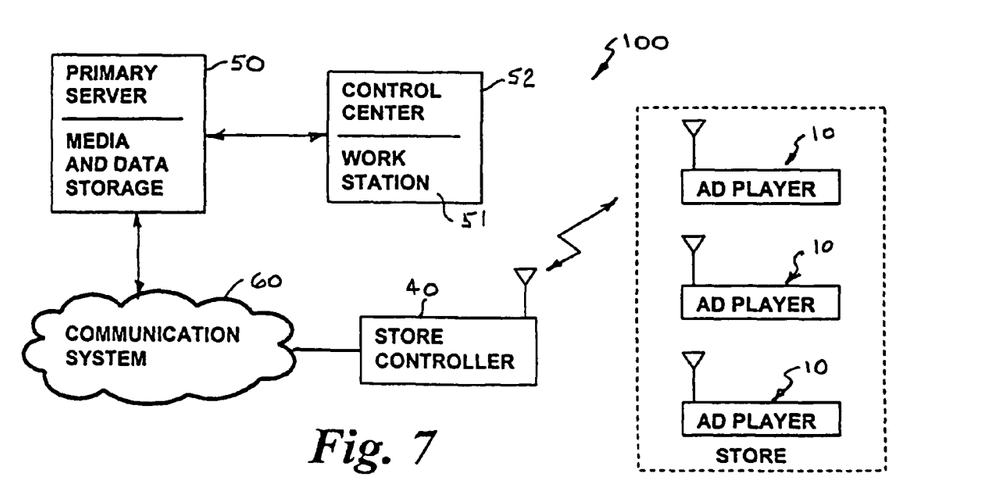
FIG. 7 is a schematic block diagram illustrating an advertising system in accordance with the present system.
Figure 8:
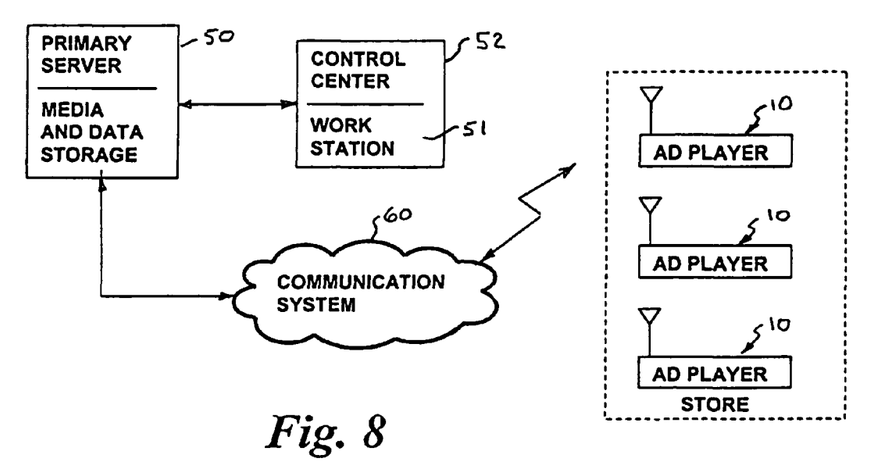
FIG. 8 is a schematic block diagram illustrating an advertising system in accordance with the present system that functions without the use of a store controller.

FIG. 7 illustrates the advertising system 100 in accordance with the present invention. The advertising players 10 are connected in wireless communication with one or more store controllers 40 that may located in an inconspicuous location remote from the advertising players; for example, but not limited thereto, in a retail store of any variety. Similarly, the store controllers 40 are connected in communication with one or more remote primary servers 50 by way of a wireless, cellular, satellite, or Internet communication system 60 or a combination thereof. The primary server 50 may be a single computer system, or an array of computer systems coupled together to form a network. The primary server or servers 50 may be commercially available computer systems, such as may be available from vendors like Hewlett-Packard and Dell, and may be a Windows® or Unix® based system or other suitable commercially-available server. Each store controller 40 may likewise be a computer system, but may not require the degree of computing capability that may be present in the primary server. A single store controller 40 may be in communication with a plurality of advertising players 10 at various locations throughout the store. Alternatively as shown in FIG. 8, in some installations, the use of the store controller 40 may be bypassed allowing for the direct communication between the primary server 50 and the advertising players 10 by utilizing the wireless communication system 60. The wireless communication system 60 provides the necessary linkage between the primary server 50 and the advertising players 10.

Figure 9:
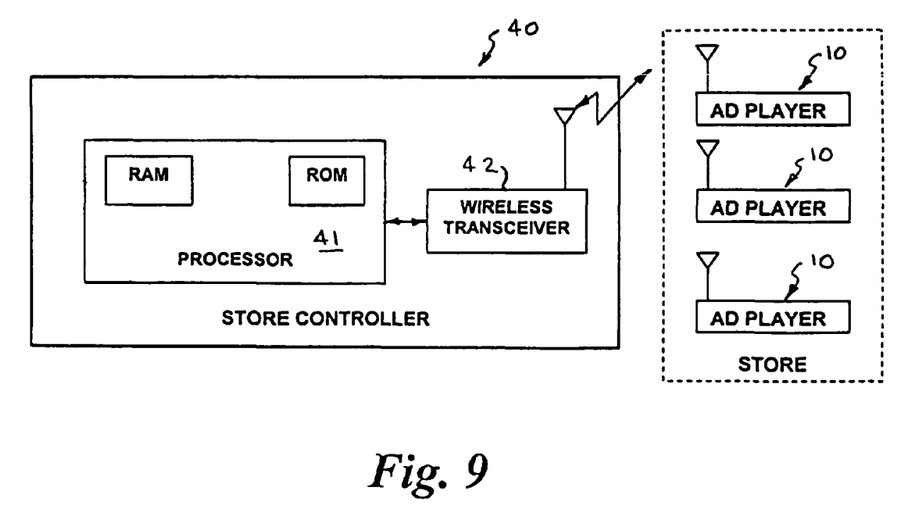
FIG. 9 is a schematic block diagram illustrating a store controller in accordance with the present invention.

FIG. 9 illustrates an example of a store controller 40 in accordance with the present invention shown in a schematic block diagram. The store controller 40 includes a processor 41 which may be any suitable commercially available controller or microprocessor. The processor 41 is connected with a wireless transceiver 42. The wireless transceiver 42 communicates with the advertising players 10 in the region of the store controller 40 via the communication system 60. Thus, each store controller 40 manages communication between the primary server 50 and the one or more advertising players 10 for which it is responsible. In at least some embodiments of the invention, the wireless transceiver 42 may operate at 900 MHz.

Referring again to FIG. 7, the primary server(s) 50 are connected in communication with one or more work stations 51 that may be located in a control center 52 remote from the primary servers by way of a wireless, cellular, satellite, or Internet communication system 60 or a combination thereof. The work station 51 is used to generate advertisements in various digital video and audio formats. Once created, the advertisements may be stored in the primary server 50. The work station 51 may also be any commercially available computer system, using a suitable operating system, capable of creating and/or editing digital video and audio content. In alternative embodiments, the work station 51 may be supplied with advertisements in various digital video and audio formats supplied from other sources, such as for example, but not limited thereto, advertisers and retailers. While the exemplary system illustrated in FIG. 7 shows only one store controller 40 coupled to the primary server 50, the primary server 50 may communicate with a plurality of store controllers 40, with one or more store controllers possibly placed in different respective retail stores.

Each primary server 50 may maintain a repository database of digital video and audio advertising media and data, and each advertisement may be assigned a unique identifier. For example, the identifier may be a 4-byte identifier, thus allowing approximately 2.5 billion unique identifiers. The advertisements may be converted by the primary server 50 from their source format to a desired digital file format, and stored into files in a database within the primary server. The different store controllers 40 may also each be assigned unique identifiers so as to be addressable so that the primary servers 50 can designate where data may be sent.

Each primary server 50 also contains a database of advertisers, a database of locations of each advertising player, and a database of advertising records. The advertising players 10 store digital video and audio advertising media and data received from a primary server 50 through the store controller 40 to be played when invoked and store the number of times an advertisement was played in a given period of time, and transmits statistical data relative to advertisements played to the primary server through the store controller.

The primary server(s) 50 download digital video and audio advertising media and data to each store controller 40 or advertising player 10, queries each said advertising player to determine the statistical data relative to advertisements played thereby, control the sequence of playing advertisements stored in by each advertising player, transmits new digital video and audio advertising media and data to each advertising player, and tracks the operating status of each advertising player.

Each primary server 50 may also manage advertiser records including organizing current and future advertisements. Managing advertiser records may include maintaining a database of stores and remote advertiser players 10 in those stores, and tracking the status of the advertising players. For example, if an advertising player 10 cannot be communicated with by the server 50, then this may be due to a malfunction of the hardware or software of the advertising player. The server 50 will then be able to identify the defective advertising player 10 for service. Alternatively, the store controller 40 may assess whether the advertising players 10 are operational and report this information to the primary server 50.

Operation

Figure 10:
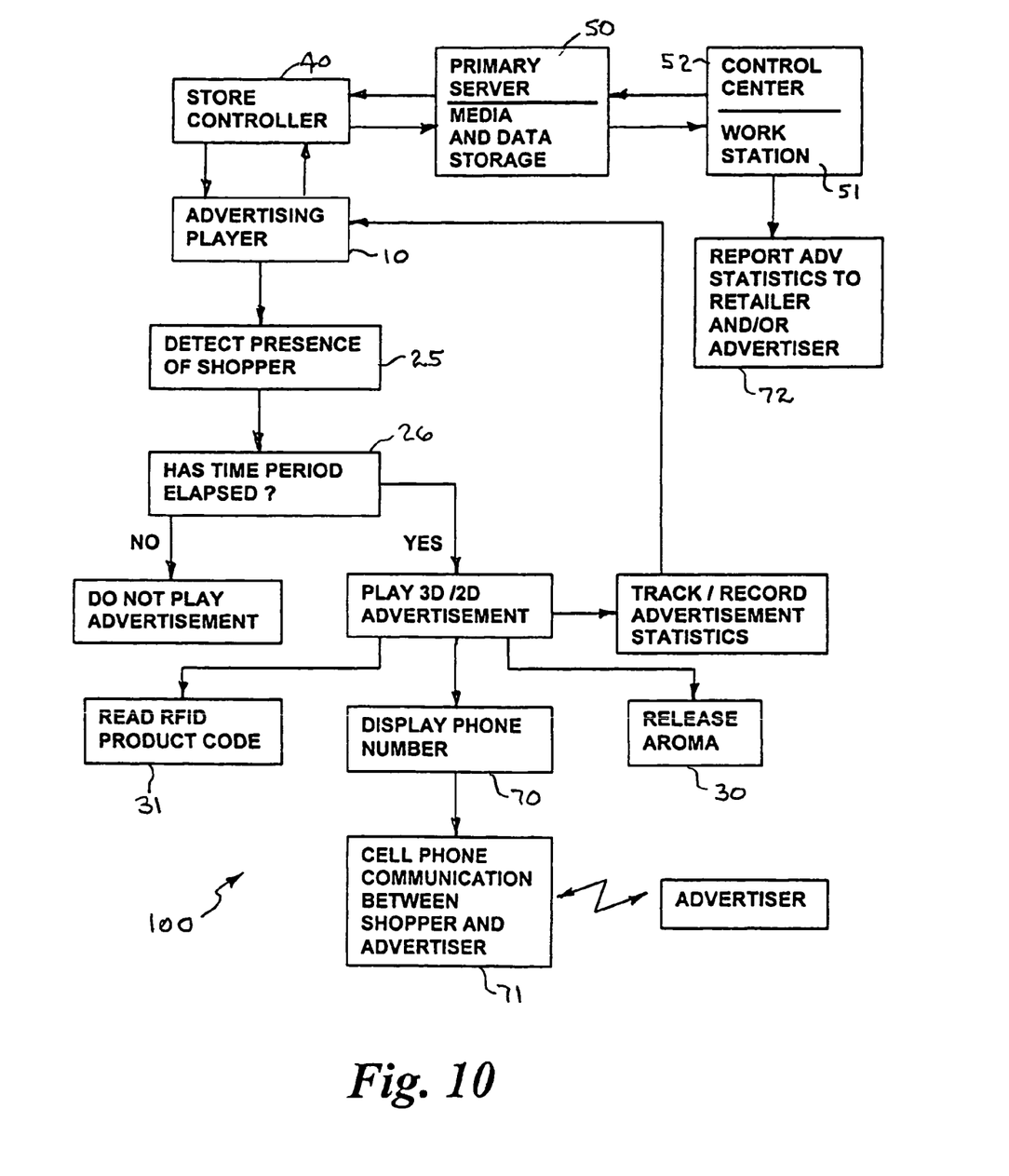
FIG. 10 is a schematic block diagram illustrating the communication between the advertising player and an establishment's central computer to transfer information.

Referring now additionally to FIG. 10, the operation of the advertising system 100 and advertising player will be described. The primary server 50, and possibly work station 51, may be placed at a central location, such as the corporate headquarters of an advertising agency or grocery store chain. A plurality of store controllers 40 may be located at least one each in one or more of the grocery stores owned by the grocery store chain. Within each store, there may be a plurality of advertising players 10 in communication with their store controller 40, and therefore in communication with the primary server 50. Though the following discussion is directed to an exemplary system operating within a grocery store and grocery store chain, this description should not be construed as limiting the use of the methods and systems to just grocery stores. Any retail establishment may utilize the methods and systems discussed herein.

In one example, but not limited thereto, one of the advertising players 10 is removably mounted at a point-of-product display of consumer goods within easy reach of the shopper, such as on or in front of the lip of a shelf, a rack, a floor standing display, a beverage dispenser or cooler, a freezer case, or a freezer door. When the advertising player 10 is initially powered up, the primary server 50 may be made aware (or detect) of the presence of the advertising player 10 and thus may transfer a plurality of advertisements in digital video and audio media and data to each store controller 40 to the media memory slots of the advertising player over the communication system 60. The store controller 40 may, in turn, forward the files to the advertising player 10, possibly at communication rates different than the communications from the primary server 50. Thus, the store controller 40 may, in some embodiments, act as a buffer and translation device, controlling the speed at which communication may flow between the store controller 40 and the advertising player 10, and possibly also implementing protocols to facilitate the communication. Thus, the advertising player 10 is provided with a plurality of advertisements to play.

When a shopper is detected proximate to the advertising player 10 at the point-of-product display of consumer goods, the sensing device 25 signals the processor 20 that a consumer has been detected and the timing device 26 is activated. The timing device 26 is calibrated to trigger the playing of an advertisement only after a predetermined period of time has elapsed from the initial detection. The elapsed time is greater than the average time it takes a person to walk past the advertising player or cross the infrared beam. This feature prevents the advertisements from being intrusive because an advertisement would is not played every time a person walks by the advertising player. This feature also allows the advertisement to be played only to those shoppers who may be spending more time at the "Point-Of-Product" display where the product or consumer goods to be advertised are displayed.

If the shopper has remained at the "Point-Of-Product" display after a predetermined period of time has elapsed from the initial detection, the advertising player 10 selects one of its plurality of advertising messages, and plays a glasses-free 3D or a 2D video advertisement that contains information related specifically to the displayed consumer goods proximate to the advertising player, and records statistical data relative to the advertisement played. The advertisement message may take various forms, such as for example, attempting to influence the shopper to purchase a particular brand or type of product within the "Point-Of-Product" display, or the advertisement may provide information relating to nutritional information related to the products at the "Point-Of-Product" display.

The advertisement message may also contain a text message which invites the shopper to call a telephone number 70 using their cell phone and have a two-way real-time conversation 71 with an advertiser representative while the shopper is standing at the at the advertiser's "Point-Of-Product" display, thereby allowing a shopper to ask a question, such as about nutrition and receive an answer, and allows the advertiser representative to thank the caller by sending a redeemable coupon for the advertised product to the caller's cell phone. This feature also allows an advertiser to capture the phone number of the caller and possibly their email address for future direct marketing efforts, and the caller, thankful for the helpful information, will most probably become a loyal customer of the advertiser.

If the advertising player 10 is equipped with an aroma release device 30, a chemical may be released to appeal to the consumer's sense of smell, or if equipped with a RFID reader (radio frequency identification device) 31 the RFID reader may read an RFID tag placed within the packaging or on the consumer goods proximate to the advertising player to detect which consumer goods the shopper has removed from the display shelf.

If an advertising player 10 acknowledges that a particular advertisement was successfully played, then the primary server 50 may signal the advertising player 10 to delete the record from its storage, and transfer a new advertisement. Each advertising player 10 has the capability of tracking the various parameters associated with playing a particular advertisement. For example, an advertising player 10 may record the time the advertising content was played and which advertisement was played 72. Further, an advertising player 10 may keep track of the number of times a particular advertisement was played in a given period of time, such as a day. The primary server 50 may periodically poll the advertising player 10 for the statistics or metrics regarding the number of times the stored advertisements have been played. Alternatively, each advertising player 10, individually or as a defined group, may report to the primary server 50, the history of when each content message was played. The playing history information may be returned after a request from a primary server 10, transmitted from an advertising player 10 based on a schedule, or after a certain number of plays. The primary server 10 tabulates this information and records the number of times an advertisement was delivered, when it was delivered, and/or to which locations it was delivered.

It should be understood that while the primary server 50 may, many times throughout the day, deliver advertisements to the advertising players 10, and the advertising players 10 may report statistics or metrics regarding advertising play back to the primary server 50, the advertising players 10 need not be in communication with the primary server 50 to be operable. For example, if the communication system 60 is inoperable, the advertising players 10 may continue to play advertisements selected from their various media slots, and track their usage. Upon the communication system 60 becoming operable, the statistics may be transferred or different advertisements may be provided.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An electronic wireless glasses-free 3D video advertisement player apparatus for mounting on a store display on or in which consumer goods for sale are disposed and displayed for selection and purchase by a shopper to play advertisements in a glasses-free three-dimensional video format containing information related to the specific consumer goods displayed proximate to the advertising player, comprising:

an electronic wireless glasses-free 3D video advertisement player having a small generally rectangular housing with an autostereoscopic 3D LCD flat panel display screen disposed on a front side including a lenticular lens or parallax barrier filter in front of the screen whereby different images are shown to the left and right eyes of an observer to provide a wide viewing angle and stereoscopic reproduction without the use of 3D glasses, an audio speaker on said front side disposed adjacent to said display screen, and a bracket mounting area on a back side thereof configured to receive selected interchangeable mounting brackets;

a mounting bracket having a first end engaged on said bracket mounting area and having a second end adapted to be releasably mounted on a surface of a display on or in which the consumer products and goods for sale are disposed selected from the group consisting of a shelf, a price channel of a shelf, a lip of a shelf, a rack, a floor standing display, a beverage dispenser, a cooler, a freezer case, and freezer door;

said mounting bracket configured to position said glasses-free 3D video advertising player housing such that said flat panel display screen is disposed adjacent and generally parallel to a front surface of the display on which it is mounted and not perpendicularly outward therefrom, and said housing of a size sufficiently small so as not to block or hide adjacent consumer goods disposed on or in the display on which it is mounted and allow products to be readily stacked or removed therefrom.

2. The electronic glasses-free 3D video advertisement player apparatus according to claim 1, wherein said mounting bracket first end comprises a first generally rectangular flat mounting plate engaged with said bracket mounting area on said back side of said housing, and having ears at laterally opposed ends disposed perpendicular thereto; and said mounting bracket second end comprises a second generally L-shaped mounting plate having a short vertical plate portion with ears at laterally opposed ends disposed perpendicular thereto pivotally and adjustably connected to said ears of said first mounting plate, and a generally rectangular flat shelf mounting plate portion extending horizontally from said short vertical plate portion having a plurality of slots therethrough adapted to be adjustably and releasably mounted to a display shelf with conventional fasteners such that said advertisement player is disposed in front of a price channel or lip of the shelf and extends generally parallel thereto.

3. The electronic glasses-free 3D video advertisement player apparatus according to claim 1, wherein said mounting bracket first end comprises a generally rectangular flat mounting plate engaged with said bracket mounting area on said back side of said housing, and having ears at laterally opposed ends disposed perpendicular thereto, a pair of laterally opposed generally L-shaped legs, each having a vertical portion pivotally and adjustably connected to said ears, and a lower horizontal leg portion extending rearward therefrom to engage the surface of a glass door of a display; and said mounting bracket second end comprises at least one suction cup extending outward from a back side of said flat mounting plate adapted to be releasably affixed to the glass door such that said advertisement player is disposed in front of the glass door and extends generally parallel thereto.

4. The electronic glasses-free 3D video advertisement player apparatus according to claim 1, further comprising:

a processor contained in said housing;

memory storage means in said housing coupled to said processor containing digital video and audio advertising media and data related to the specific consumer goods displayed proximate to said advertisement player;

a video codec and an audio codec in said housing coupled to said processor, said autostereoscopic 3D LCD display, and said speaker, for reproducing and playing glasses-free 3D video and audio advertisements from said digital video and audio media and data;

a wireless communication device in said housing coupled to said processor configured to receive and transmit digital video and audio advertising media and data from and to a remote server;

a sensing device on said housing coupled to said processor for detecting only the presence of an unidentified shopper proximate to said advertisement player and display of consumer goods, and not detecting the identity, features, and/or distinguishing characteristics associated with the sensed shopper; and a timer device in said housing coupled with said processor and said sensing device for determining the period of time the sensed shopper has remained proximate to said advertisement player and display of consumer goods;

said timer device calibrated to trigger the playing of an advertisement only after a predetermined period of time has elapsed from initial detection by said sensing device of the shopper proximate to said advertisement player and display of consumer goods, the elapsed period of time being sufficient to prevent advertisements from being played when shoppers walk past said advertising player and display of consumer goods, and allow advertisements to be played only to those shoppers who remain present at the display of consumer goods for said period of elapsed time.

5. An electronic glasses-free 3D advertising system for providing advertisements in a glasses-free three-dimensional video format containing information related to specific consumer goods disposed on or in a store display to an anonymous shopper based on the presence of the shopper at a location proximate to the display for a predetermined period of time, comprising:

- an electronic wireless glasses-free 3D video advertisement player apparatus having a small generally rectangular housing with an autostereoscopic 3D LCD flat panel display screen disposed on a front side including a lenticular lens or parallax barrier filter in front of the screen whereby different images are shown to the left and right eyes of an observer to provide a wide viewing angle and stereoscopic reproduction without the use of 3D glasses, an audio speaker on said front side disposed adjacent to said display screen, said advertisement player releasably mounted on a surface of a display on or in which the consumer goods are disposed selected from the group consisting of a shelf, a price channel of a shelf, a lip of a shelf, a rack, a floor standing display, a beverage dispenser, a cooler, a freezer case, and freezer door, said advertisement player flat panel display screen disposed adjacent and generally parallel to a front surface of the display on which it is mounted;
- a processor contained in said advertisement player housing;
- memory storage means in said housing coupled to said processor containing digital video and audio advertising media and data related to the specific consumer goods displayed proximate to said advertisement player;
- a video codec and an audio codec in said housing coupled to said processor, said autostereoscopic 3D LCD display, and said speaker, for reproducing and playing glasses-free 3D video and audio advertisements from said digital video and audio media and data;
- a wireless communication device in said housing coupled to said processor configured to receive and transmit digital video and audio advertising media and data from and to a remote server;
- a sensing device on said housing coupled to said processor for detecting the presence of an unidentified shopper proximate to said advertisement player and display of consumer goods, and not detecting the identity, features, and/or distinguishing characteristics associated with the sensed shopper;
- a timer device in said housing coupled with said processor and said sensing device for determining the period of time the sensed shopper has remained proximate to said advertisement player and display of consumer goods;
- said timer device calibrated to trigger the playing of an advertisement only after a predetermined period of time has elapsed from initial detection by said sensing device of the shopper proximate to said advertisement player and display of consumer goods, the elapsed period of time being sufficient to prevent advertisements from being played when shoppers walk past said advertising player and display of consumer goods, and allow advertisements to be played only to those shoppers who remain present at the display of consumer goods for said period of elapsed time;
- said processor programmed to store received digital video and audio advertising media and data related to consumer goods in said memory storage means and, when invoked upon detection by said sensing device and said timer means, of the presence of an unidentified shopper proximate to said advertising player and display of consumer goods for a predetermined period of time, to retrieve an advertisement stored in said memory means containing information related to the consumer goods displayed proximate to said advertising player and play the retrieved advertisement in a glasses-free three-dimensional video format via said video display and audio speaker, and to store in said memory means the number of times an advertisement was played in a given period of time, and to transmit, via said communication device, statistical data relative to advertisements played by said advertising player; and
- a server disposed remote from said advertising player, said server connected with a controller processor, a communication device coupled to said controller processor and in communication with said communication device of said advertising player for transmitting and receiving digital video and audio advertising media and data therebetween;
- said server having memory storage means connected with said controller processor containing a database of advertisers, a database of locations of each said advertising player, a repository database of said digital video and audio advertising media and data stored in said memory of each said advertising player, and a database of advertising records; and
- said server operative to download digital video and audio advertising media and data to each said advertising player, to query each said advertising player to determine the statistical data relative to advertisements played thereby, to alter the sequence of playing advertisements stored in said memory of each said advertising player, to delete selected advertisements from said memory of each said advertising player, to transmit new digital video and audio advertising media and data to be stored in said memory of each said advertising player, and to track the operating status of each said advertising player.

* * * * *